(12) United States Patent
Taema (10) Patent No.: US 9,685,832 B2
(45) Date of Patent: Jun. 20, 2017

(54) STATOR INSULATOR STRUCTURE WITH REDUCED RESIDUAL STRESS AND IMPROVED DURABILITY

(75) Inventor: Yoshihiro Taema, Kawasaki (JP)

(73) Assignee: FUJITSU GENERAL LIMITED, Kanagawa (JP)

(*) Notice: Subject to any disclaimer, the term of this patent is extended or adjusted under 35 U.S.C. 154(b) by 306 days.

(21) Appl. No.: 14/375,604

(22) PCT Filed: Mar. 30, 2012

(86) PCT No.: PCT/JP2012/058563
§ 371 (c)(1),
(2), (4) Date: Oct. 7, 2014

(87) PCT Pub. No.: WO2013/114636
PCT Pub. Date: Aug. 8, 2013

(65) Prior Publication Data
US 2015/0035404 A1    Feb. 5, 2015

(30) Foreign Application Priority Data

Jan. 31, 2012 (JP) .................. 2012-017630

(51) Int. Cl.
*H02K 3/34* (2006.01)
*H02K 3/32* (2006.01)
(Continued)

(52) U.S. Cl.
CPC .................. *H02K 3/28* (2013.01); *H02K 3/32* (2013.01); *H02K 3/34* (2013.01); *H02K 3/345* (2013.01);
(Continued)

(58) Field of Classification Search
CPC .......... H02K 3/487; H02K 3/34; H02K 3/345; H02K 3/48; H02K 3/38; H02K 3/32;
(Continued)

(56) References Cited

U.S. PATENT DOCUMENTS 7,739,788 B1   6/2010  Prochazka
8,513,851 B2   8/2013  Tsukamoto et al.
(Continued)

FOREIGN PATENT DOCUMENTS

FR   2986384 A1   8/2013
JP   2008-211873  9/2008
(Continued)

OTHER PUBLICATIONS

Tsukamoto Satoshi; Shirasaka Hiroki; Kagawa Yoshinori; Murakami Seiichi, Stator Motor and Compressor, Aug. 12, 2010, Daikin Ind. Ltd, WO2010090082.*

(Continued)

*Primary Examiner* — Joshua Benitez-Rosario
*Assistant Examiner* — Alexander Singh
(74) *Attorney, Agent, or Firm* — Rankin, Hill & Clark LLP (57) ABSTRACT

The electric motor includes a rotor and a stator, the stator having a conductive wire wound thereon via a stator core and insulators. The insulators include an annular outer peripheral wall portion with the conductive wire run on an outer periphery side of the peripheral wall portion, a plurality of winding body portions protruding radially from the outer peripheral wall portion, and an inner flange portion. The outer peripheral wall portion on the winding body portion side includes an outer peripheral surface formed in an arc shape. The radial thickness of the outer peripheral wall portion is increasingly greater toward the circumferential center of the winding body portions.

4 Claims, 8 Drawing Sheets

(51) Int. Cl.
  *H02K 3/46* (2006.01)
  *H02K 3/28* (2006.01)
  *H02K 3/52* (2006.01)
  *H02K 15/095* (2006.01)

(52) U.S. Cl.
  CPC .............. *H02K 3/46* (2013.01); *H02K 3/522* (2013.01); *H02K 15/095* (2013.01); *H02K 2203/12* (2013.01)

(58) Field of Classification Search
  CPC  H02K 3/522; H02K 3/46; H02K 5/15; H02K 2203/12; H02K 3/52; H02K 3/28; H02K 15/095
  USPC ... 310/214, 215, 216.114, 216.115, 216.082, 310/194, 260
  See application file for complete search history.

(56) References Cited

U.S. PATENT DOCUMENTS

| | | |
|---|---|---|
| 2003/0011271 A1 | 1/2003 | Ando |
| 2003/0122445 A1 | 7/2003 | Takano |
| 2004/0084605 A1 | 5/2004 | Yokoyama |
| 2005/0044692 A1 | 3/2005 | Ando |
| 2009/0189474 A1* | 7/2009 | van Heyden .......... H02K 3/522 310/195 |
| 2010/0096945 A1 | 4/2010 | Tsukamoto et al. |

FOREIGN PATENT DOCUMENTS

| | | |
|---|---|---|
| JP | 2009-22141 | 1/2009 |
| JP | 2010-183660 | 8/2010 |
| JP | 2011-139549 | 7/2011 |
| JP | 4788881 | 10/2011 |
| WO | WO 2010090082 A1 * | 8/2010 ............. H02K 3/522 |

OTHER PUBLICATIONS

Japanese Office Action dated Jun. 26, 2012; Application No. 2012-017630; English Translation included.
International Search Report dated Jun. 26, 2012; Application No. PCT/JP2012/058563.
Extended European Search Report issued on Mar. 23, 2016 for the corresponding EP Patent Application No. 12867284.7.

* cited by examiner

STATOR INSULATOR STRUCTURE WITH REDUCED RESIDUAL STRESS AND IMPROVED DURABILITY

TECHNICAL FIELD

The present invention relates to an electric motor including a rotor and a stator disposed outside the rotor.

BACKGROUND ART

Conventionally, an electric motor used in a compressor or the like of an air conditioner or refrigerator includes a rotor and a tubular stator radially disposed outside the rotor. The stator includes a stator core and insulators disposed facing the opposite axial both end surfaces of the stator core. The insulators are formed of an insulating material, such as resin.

Figure 9:
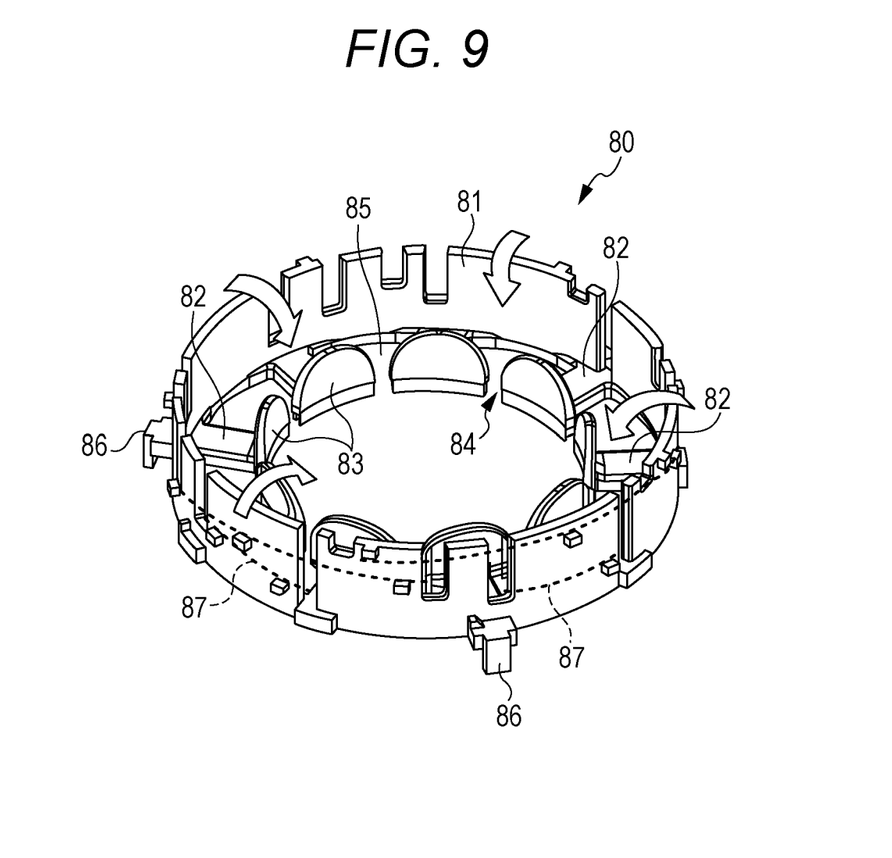
FIG. 9 is a perspective view of a conventional insulator illustrating the problem of the conventional art.

Referring to FIG. 9, a conventional insulator 80 includes a cylindrical outer peripheral wall portion 81, a plurality of winding body portions 82, and inner flange portions 83. The winding body portions 82 protrude radially from the outer peripheral wall portion 81 toward the inner side in the radial direction. The inner flange portions 83 rise from the inner ends of the respective winding body portions 82 in the axial direction of the cylinder. An insulator opening 84 is formed between the adjacent inner flange portions 83. An insulator slot 85 is formed as a fan-shaped space enclosed by the outer peripheral wall portion 81 of the insulator 80 and the adjacent winding body portions 82. The outer peripheral wall portion 81 of the insulator 80 includes three outer nails 86 externally fitting on an outer peripheral end portion of the stator core (not shown). The outer nails 86 are configured to fix the insulator 80 to the stator core. In the conventional insulator 80 configured as described above, when an armature coil is formed by winding a conductive wire on each of the winding body portions 82, the conductive wire is extended over the outer peripheral surface of the outer peripheral wall portion 81 according to the connection relationship of the windings. In this way, crossover wires 87 are extended without slack (see Patent Literature 1, for example).

CITATION LIST

Patent Literature

Patent Literature 1: JP-A-2008-211873

SUMMARY OF INVENTION

Problems to be Solved by the Invention

However, in the insulator 80 as illustrated in FIG. 9, residual stress due to the characteristics of the resin material used for the insulator 80 causes an inward falling event where the outer peripheral wall portion 81 falls inward over time as indicated by outline arrows. In the insulator 80 in which the inward falling event has developed, a gap may be formed between the outer peripheral wall portion 81 and the crossover wires 87. This may lead to a problem in that the insulating performance of the conductive wire is adversely affected by frictional rubbing caused, for example, during the operation of the electric motor or by vibrations due to the flow velocity of refrigerant.

It may be feasible to provide inward falling preventing ribs at the L-shaped portions formed by the outer peripheral wall portion 81 and the winding body portions 82 of the insulator 80. However, such ribs on the winding body portions 82 would provide an obstacle to the winding operation and hinder aligned winding.

The present invention has been made in view of the above problem, and an object of the present invention is to provide an electric motor having an insulator capable of reducing the inward falling phenomenon due to variation of the outer peripheral wall portion, the variation being caused by the operation of the electric motor over time with respect to the winding body portions of the insulator.

Solutions to the Problems

In order to solve the above problem and achieve the object, the feature of the present invention is that an electric motor includes a rotor and a stator radially disposed outside the rotor, where the stator includes a stator core and insulators, both formed in an approximately tubular shape, and a conductive wire wound on the stator core via the insulators. The insulators are disposed facing the opposite axial both end surfaces of the stator core and each include an annular outer peripheral wall portion contacting an end surface of an annular yoke of the stator core, with a conductive wire serving as a crossover wire run on an outer periphery side of the outer peripheral wall portion; a plurality of winding body portions protruding radially from the outer peripheral wall portion toward an inner side in a radial direction and having the conductive wire wound thereon; and an inner flange portion rising from an inner end of each of the winding body portions in the axial direction. The outer peripheral wall portion includes an inner peripheral surface on the winding body portion side, the inner peripheral surface having a planar portion perpendicular to the direction in which the winding body portions protrude, the outer peripheral wall portion on the winding body portion side having an outer peripheral surface formed in an arc shape. The outer peripheral wall portion has a radial thickness which is increasingly greater toward a circumferential center of the winding body portions.

Furthermore, the feature of the present invention is that a groove portion is cut out from the outer peripheral wall portion toward a radially inner side, the groove portion extending from the side of an end surface of the outer peripheral wall portion contacting the stator core to the side of an end surface of the plurality of winding body portions contacting the stator core.

Further, the feature of the present invention is that the groove portion has a radial length greater than a radial thickness of the outer peripheral wall portion at the circumferential center of the winding body portion.

Furthermore, the feature of the present invention is that a protrusion is formed by protruding a part of the outer peripheral wall portion on which the winding body portion is disposed, the protrusion protruding toward an outer side in the radial direction, wherein the groove portion extends to the protrusion.

Effects of the Invention

According to the present invention, the inner peripheral surface of the outer peripheral wall portion of the insulator on the winding body portion side includes the planar portion perpendicular to the direction in which the winding body portions protrude. The outer peripheral surface of the outer peripheral wall portion on the winding body portion side is formed in an arc shape. The radial thickness of the outer peripheral wall portion is increased toward the circumferential center of the winding body portion. Thus, there is obtained the effect that the inward falling of the outer peripheral wall portion of the insulator is difficult to occur, and that the winding can be wound on the winding body portions at high space factor.

BRIEF DESCRIPTION OF THE DRAWINGS

FIG. 5-1 is a partially enlarged plan view of the insulator of FIG. 2 as viewed from above.

FIG. 5-2 is another partially enlarged plan view of the insulator of FIG. 2 as viewed from above.

DESCRIPTION OF EMBODIMENTS

In the following, embodiments of the electric motor according to the present invention will be described with reference to the drawings. It should be noted that the invention is not limited to the embodiments.

Embodiments

Figure 1:
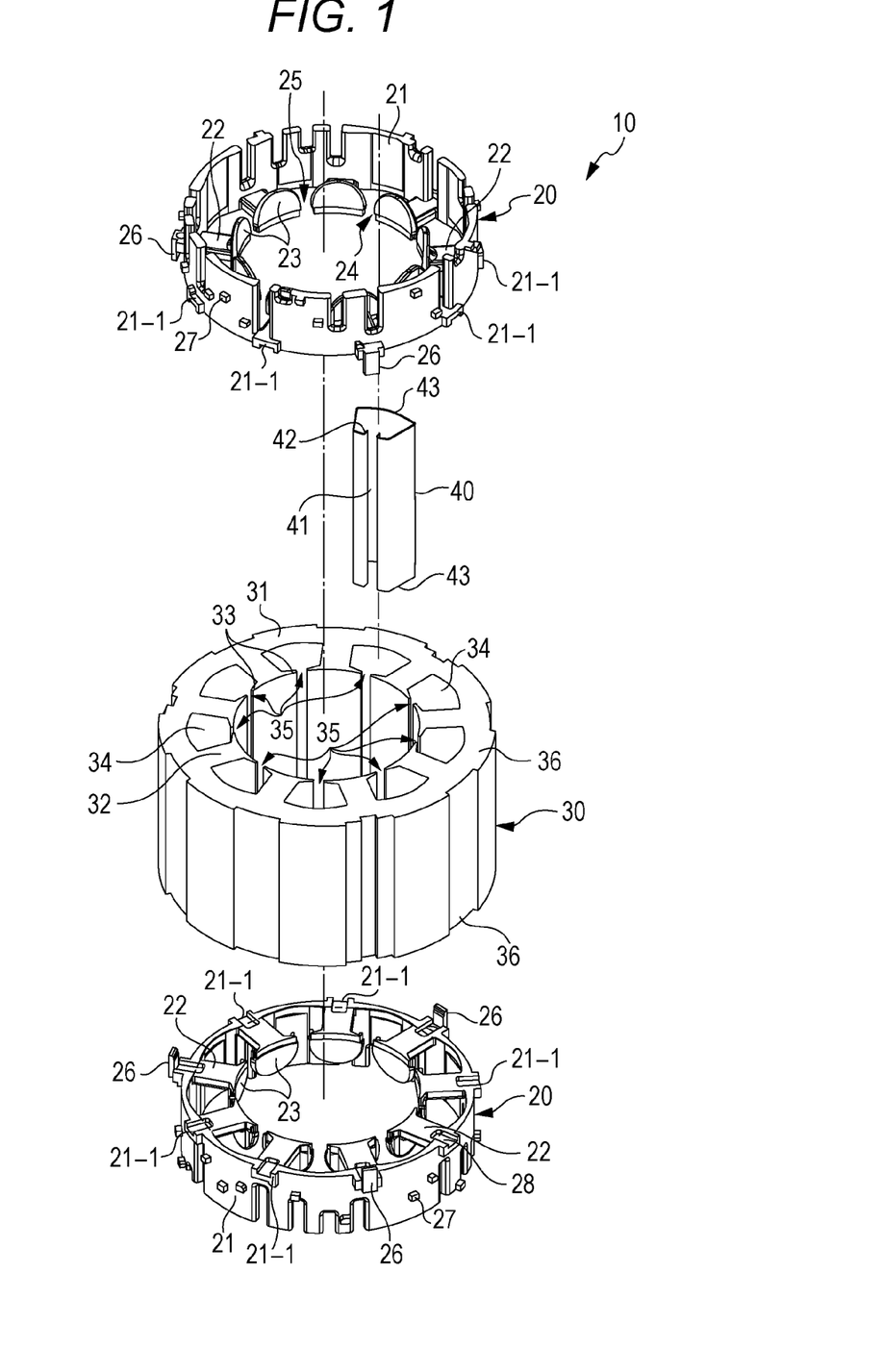
FIG. 1 is an exploded perspective view of a stator of an electric motor according to the present invention.
Figure 2:
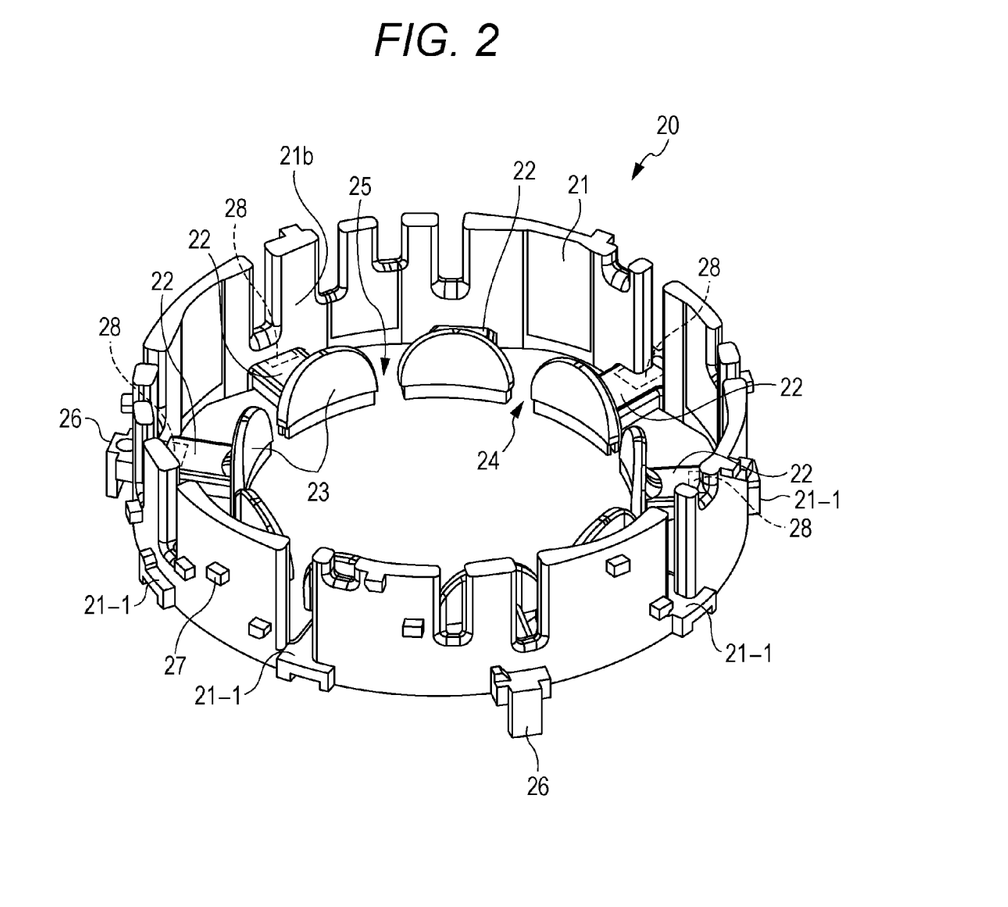
FIG. 2 is an enlarged perspective view of an upper insulator of FIG. 1.
Figure 3:
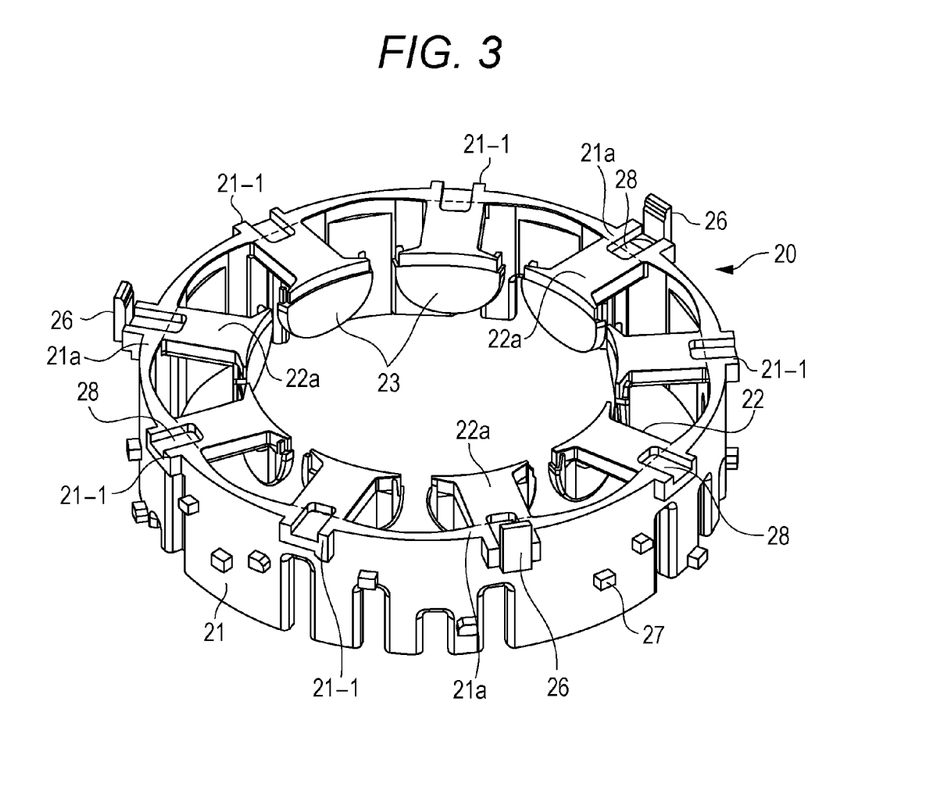
FIG. 3 is an enlarged perspective view of a lower insulator of FIG. 1.
Figure 4:
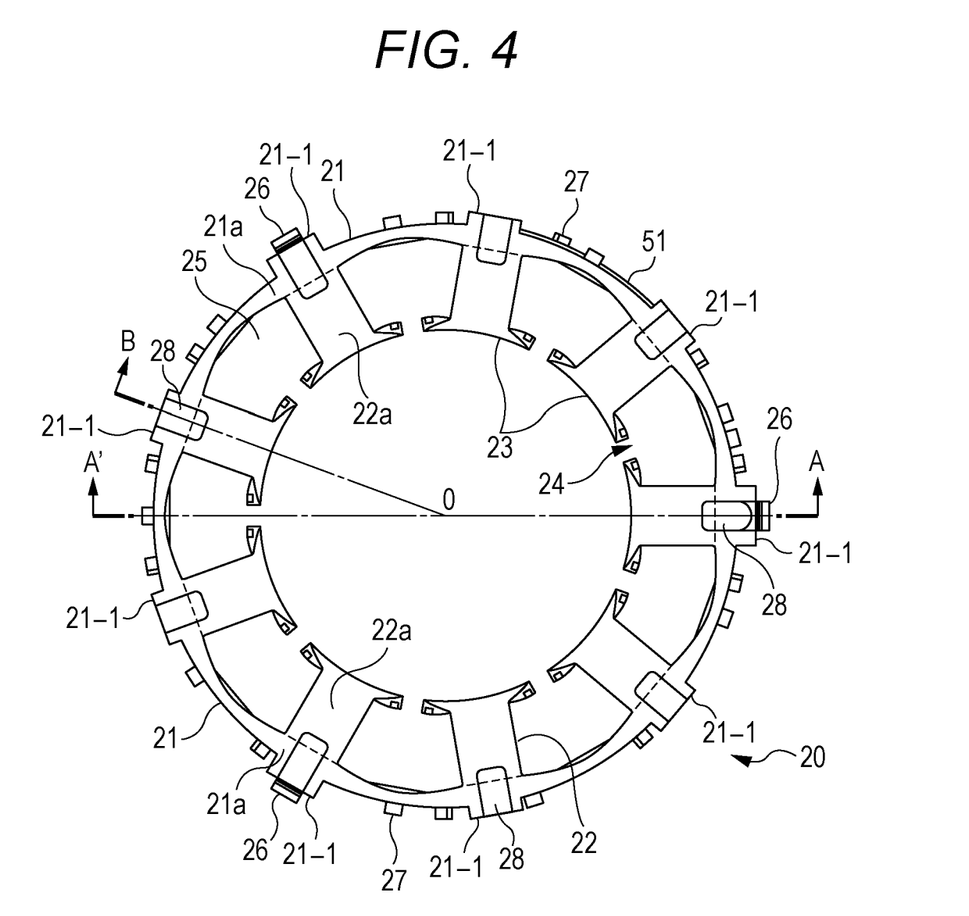
FIG. 4 is a plan view of the insulator of FIG. 3 as viewed from above.
Figure 6:
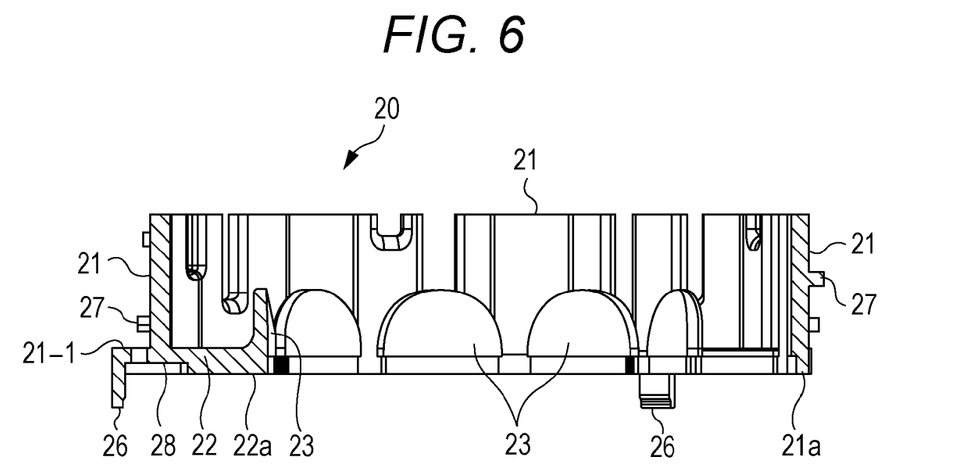
FIG. 6 is a cross sectional view taken along line A-A' in FIG. 4.
Figure 7:
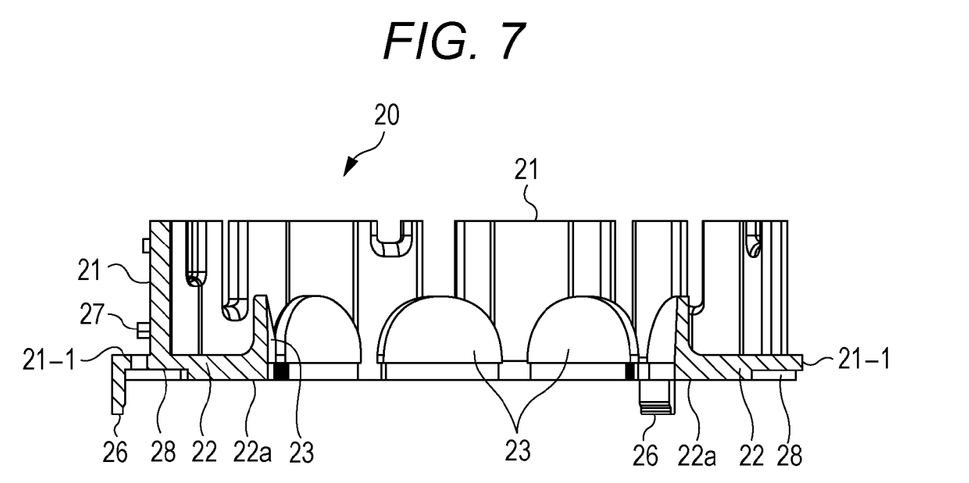
FIG. 7 is a cross sectional view taken along line A-O-B in FIG. 4.
Figure 8:
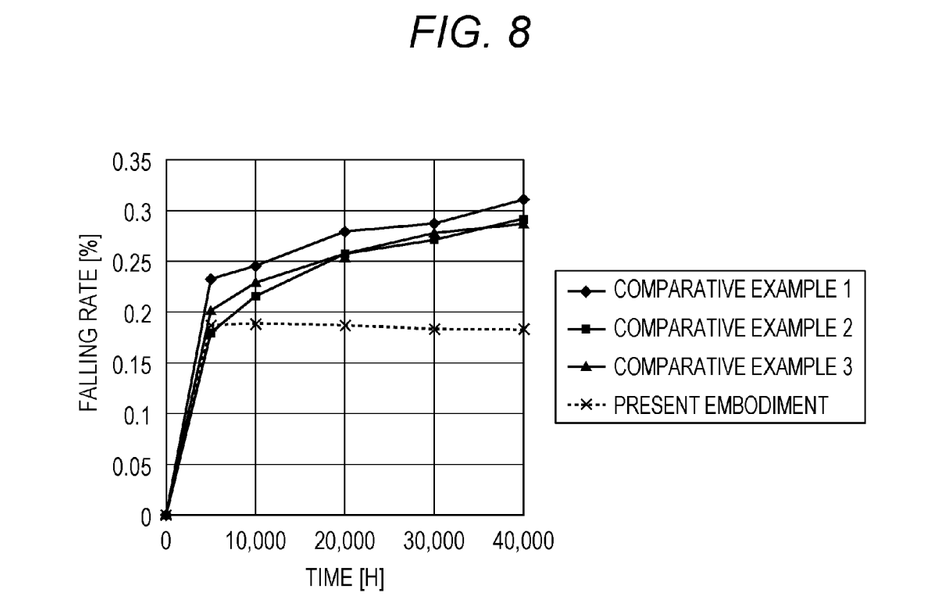
FIG. 8 is a transition diagram plotting different amounts of displacement due to variation with time that were measured for the insulators according to the present embodiment and a plurality of comparative examples.

FIG. 1 is an exploded perspective view of a stator of an electric motor according to the present invention. FIG. 2 is an enlarged perspective view of an upper insulator of FIG. 1. FIG. 3 is an enlarged perspective view of a lower insulator of FIG. 1. FIG. 4 is a plan view of the insulator of FIG. 3 as viewed from above. FIG. 5-1 is a partially enlarged plan view of the insulator of FIG. 2 as viewed from above. FIG. 5-2 is another partially enlarged plan view of the insulator of FIG. 2 as viewed from above. FIG. 6 is a cross sectional view taken along line A-A' in FIG. 4. FIG. 7 is a cross sectional view taken along line A-O-B in FIG. 4. FIG. 8 is a transition diagram plotting the degrees of falling of an outer peripheral wall portion toward the radially inner side due to variation with time, measured for the insulators according to the present embodiment and a plurality of comparative examples.

As illustrated in FIG. 1, a stator 10 of the electric motor according to the present embodiment includes a stator core 30, insulation films 40, and insulators 20. The insulation film 40 is inserted in a slot 34 of the stator core 30 to insulate the slot 34 and a conductive wire 52 illustrated in FIG. 5. The insulators 20 are mounted on opposite axial end portions 36, 36 of the stator core 30 to insulate both the axial end portions 36 and the conductive wire 52.

The stator core 30 is formed in a tubular shape by laminating magnetic steel sheets punched in an annular shape. The stator core 30 includes a ring-shaped yoke 31, and teeth 32 protruding from the yoke 31 toward the center. The tooth 32 has a tip from which tip edges 33 protrude in a circumferential direction.

The slots 34, fan-shaped air gaps, are surrounded by inner peripheral sides of the yoke 31 and the adjacent teeth 32. Slot openings 35, air gaps, are formed between the opposite tip edges 33 protruding from the tips of the teeth 32 in the circumferential direction, As illustrated in FIGS. 1 to 5, the insulator 20 is formed in a short tubular shape. The insulator 20 includes an outer peripheral wall portion 21, winding body portions 22, and insulator edges 23. The outer peripheral wall portion 21 is mounted on the yoke 31 of the stator core 30. The winding body portion 22 protrudes from the stator core 30 side of the outer peripheral wall portion 21 toward the center, and covers the corresponding tooth 32 of the stator core 30. The insulator edge 23 is an inner flange portion protruding from the tip of the winding body portion 22 in the circumferential direction and the axial direction.

Insulator slots 25 and insulator openings 24, which have shapes identical to the slots 34 and the slot openings 35 of the stator core 30, are formed on the stator core 30 side of the outer peripheral wall portion 21 such that they can be surrounded by the winding body portions 22 and the insulator edges 23. On the outer peripheral surface of the outer peripheral wall portion 21, a number of projections 27 for holding and wiring the conductive wire 52 are disposed. Further, the insulator 20 includes three outer nails 26 on the stator core 30 side of the outer peripheral wall portion 21. The outer nails 26 are externally fitted on the axial end portions 36 of the stator core 30 to fix the insulator 20 to the stator core 30.

As illustrated in FIG. 1, the insulation films 40 are formed of PET film or the like. The insulation film 40 is folded into a tubular shape with fan-shaped cross section such that the film can be closely fitted on the inner wall of the slot 34. Simultaneously, gate portions 42 at both edges in the circumferential direction are folded toward the inner side of the tube, thus forming a film opening 41 with an opening width not less than (equal to or greater than) an opening width of the slot opening 35. The insulation film 40 has an axial length greater than the axial length of the stator core 30. Thus, when the insulation film 40 is inserted in the slot 34, the axial end portion 43 of the insulation film 40 protrudes from the axial end portion 36 of the stator core 30.

The insulation film of the present embodiment is not limited to the above, and may be variously modified according to an apparatus in which the electric motor is used. For example, when used in a compressor for compressing refrigerant, it is preferable to use a flame-resistant insulation film, such as a polyphenylene sulfide film or an insulation film including aramid fibers, instead of PET film.

Figure 51:
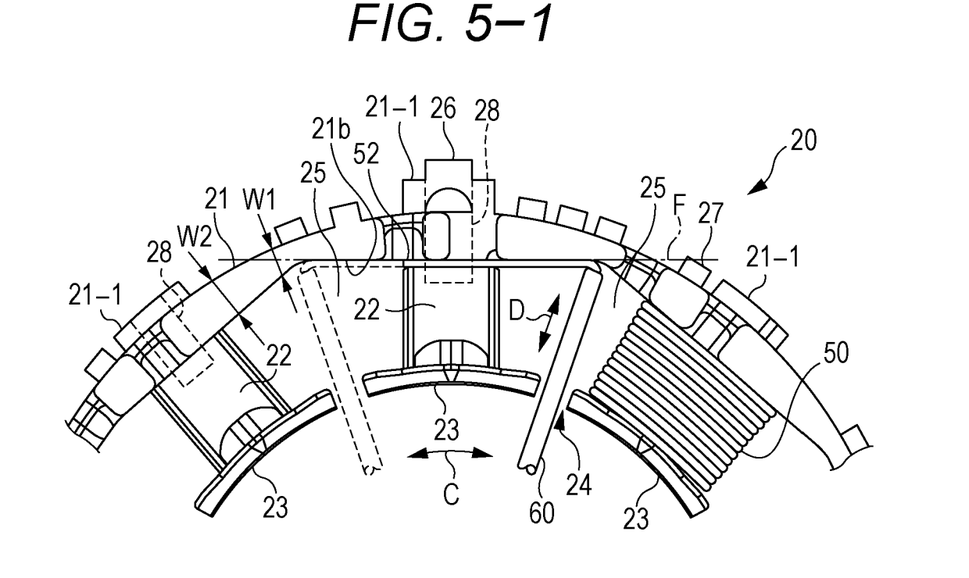

As illustrated in FIG. 5-1, the insulator 20 in the stator of the electric motor according to the present embodiment has a characteristic configuration in that the outer peripheral wall portion 21 has a variation in radial thickness depending on location. Specifically, an inner peripheral surface of the outer peripheral wall portion 21 on the winding body portion 22 side thereof is formed in a planar shape (planar portion 21b disposed at the position indicated by a dashed and single-dotted line F) perpendicular to the winding body portions 22, while the outer peripheral surface of the outer peripheral wall portion is formed in an arc shape. Thus, the outer peripheral wall portion 21 on the winding body portion 22 side has a radial thickness (W2) greater than a radial thickness (W1) of the outer peripheral wall portion 21 at a position intermediate between the adjacent winding body portions 22.

Hence, with a reinforcement in which the radial thickness of the outer peripheral wall portion 21 is gradually increased toward the circumferential center of the winding body portion 22, each of the winding body portions 22 can prevent the outer peripheral wall portion 21 from inward falling. The configuration in which the outer peripheral wall portion 21 has the varied radial thicknesses is not only illustrated in FIG. 5-1 but also illustrated in the perspective views of FIG. 2 and FIG. 3, the plan view of FIG. 4, and FIG. 5-2, which will be described below.

In the insulators 20 of the stator of the electric motor according to the present embodiment, as illustrated in FIG. 5-1, the planar portion 21*b* perpendicular to the winding body portions 22 is the inner peripheral surface of the outer peripheral wall portion 21 of the insulator 20 on the winding body portion 22 side. Thus, when the conductive wire 52 is wound on the winding body portions 22, the winding 50 becomes parallel with the inner peripheral surface of the outer peripheral wall portion 21. Therefore, the aligned winding where the conductive wire 52 is regularly stacked from the end of the winding body portions 22 can be performed.

Specifically, as illustrated in FIG. 5-1, a part of the inner peripheral surface of the outer peripheral wall portion 21 where the winding body portions 22 and the outer peripheral wall portion 21 contact each other provides the planar portion 21*b* formed in a planar shape along the dashed and single-dotted line F perpendicular to the winding body portions 22. Thus, the radial thickness of the outer peripheral wall portion 21 is increased on the side of the winding body portions 22. In this way, when the conductive wire 52 is wound using a nozzle 60 of a winding machine as illustrated in FIG. 5-1, the planar portion 21*b* is parallel with the direction in which the winding 50 is wound. This enables the implementation of the aligned winding without gaps, starting from the end of the winding body portions 22. The aligned wound windings operate to support the outer peripheral wall portion 21 by supporting the radially outer side of the winding body portions 22 of the insulator 20. As a result, the outer peripheral wall portion 21 can be prevented from the inward falling.

Referring to FIG. 5-1, when the conductive wire 52 is wound on the winding body portions 22 using the winding machine, the winding body portions 22 of one insulator 20, the teeth of the stator core (not shown) that are axially disposed in contact with the end surfaces of the winding body portions 22, and the winding body portions of another insulator disposed on the end surfaces on the opposite side of the teeth in an opposed manner are integrated. Then, the nozzle 60 of the winding machine is inserted through the insulator openings 24. The nozzle 60 of the winding machine can be rotated in the direction of arrow C (left-right directions) while being slid in the depth direction of FIG. 5-1. Further, in order to perform the aligned winding in sequence from the end of the winding body portions 22 of the insulator 20, the nozzle 60 itself is configured to be extendable in the arrow D direction (radial direction). The winding 50 is then wound as the conductive wire 52 is released from the tip of the nozzle 60 and wound around the winding body portions 22 and the teeth. The inner peripheral surface of the outer peripheral wall portion 21 of the winding body portions 22 of the insulator 20 is formed in a planar shape perpendicular to the winding body portions 22. Thus, when the conductive wire 52 is wound on the winding body portions 22 using the nozzle 60 of the winding machine, the aligned winding can be implemented from the end of the winding body portions 22 without gaps. The aligned wound windings operate to support the radially outer side of the winding body portions 22 of the insulator 20, thereby providing the winding 50 with little winding disorder and providing a high space factor.

Further, in the insulators 20 of the stator of the electric motor according to the present embodiment, as illustrated in FIG. 3, FIG. 4, FIG. 5-1, and FIG. 7, protrusions 21-1 are formed by parts of the outer peripheral wall portion 21 where the winding body portions 22 are disposed, the parts protruding toward the outer side in the radial direction.

Thus, in the insulator 20 of the present embodiment, the inner peripheral surface of the outer peripheral wall portion 21 on the winding body portion 22 side includes the planar portion 21*b* perpendicular to the direction in which the winding body portions 22 protrude. Further, the outer peripheral surface of the outer peripheral wall portion 21 on the winding body portion 22 side is formed in an arc shape. Thus, the radial thickness of the outer peripheral wall portion 21 is made greater toward the circumferential center of the winding body portion 22. Thus, the windings can be wound on the winding body portions 22 in an aligned manner, whereby a high space factor can be achieved. In addition, the radially outer side of the winding body portions 22 of the insulator 20 can be supported by the aligned wound windings. In this way, the inward falling of the outer peripheral wall portion 21 due to variation with time can be prevented. This makes it difficult for a gap to be formed between the outer peripheral wall portion 21 of the insulator 20 and a crossover wire 51 in the insulator 20 of the present embodiment. As a result, the deterioration in insulating performance of the conductive wire 52 due to frictional rubbing caused by, for example, vibrations during the rotation of the electric motor, or by vibrations caused by the flow velocity of refrigerant can be prevented.

In the insulator 20 of the present embodiment, the protrusions 21-1 are formed by parts of the outer peripheral wall portion 21 where the winding body portions 22 are disposed, the parts protruding toward the outer side in the radial direction. Thus, the falling of the outer peripheral wall portion 21 toward the radially outer side can also be prevented. Thus, when the conductive wire is wound on the winding body portions 22, the aligned winding can be implemented while the conductive wire is reliably supported.

Figure 52:
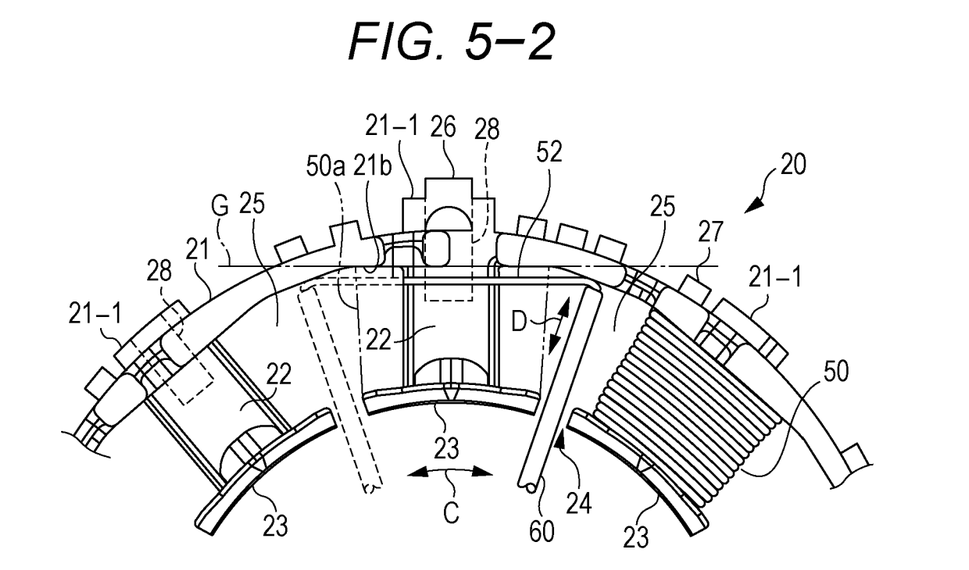

In another configuration of the insulator 20 in the stator of the electric motor according to the present embodiment, as illustrated in FIG. 5-2, the radial thickness of the outer peripheral wall portion 21 is not so greatly varied as in FIG. 5-1. However, in this configuration of the insulator 20, a part of the inner peripheral surface of the outer peripheral wall portion 21 on the winding body portion 22 side is similarly formed in a planar shape perpendicular to the winding body portions 22 (planar portion 21*b* disposed at the position indicated by a dashed and single-dotted line G), with the outer peripheral surface of the outer peripheral wall portion 21 formed in an arc shape. Thus, the radial thickness of the outer peripheral wall portion 21 on the winding body portion 22 side is greater than the thickness of the outer peripheral wall portion 21 at the position intermediate between the adjacent winding body portions 22.

When the conductive wire 52 is wound on the winding body portions 22 of the insulator 20, configured as described above, using the nozzle 60 of the winding machine, as illustrated in FIG. 5-2, winding of the conductive wire 52 is started from a position with a gap from the planar portion 21b disposed at the position of the dashed and single-dotted line G. However, in FIG. 5-2, the position of the wound winding is indicated by a dashed and double-dotted line as a winding position 50a. The winding position 50a is within the range of the planar portion 21b disposed at the position of the dashed and single-dotted line G. That is, as long as the inner peripheral surface of the outer peripheral wall portion 21 on the winding body portion 22 side at the eventual winding position 50a includes at least the planar portion 21b, the winding can be eventually performed by the aligned winding even if the winding of the conductive wire 52 released from the nozzle 60 of the winding machine is started from the position spaced apart from the planar portion 21b.

The reason is that, as described in Japanese Patent No. 4788881 previously filed by the present applicant, by winding the conductive wire at the deepest position that the nozzle of the winding machine can reach, the conductive wire is wound beyond the deepest position the nozzle can reach. Thus, the aligned winding where the conductive wire is regularly stacked from the end of the winding body portion can be performed. In other words, the configuration of the insulators of the electric motor according to the present embodiment has a certain range including modes intermediate between FIG. 5-1 and FIG. 5-2.

Another characteristic configuration of the insulators 20 in the stator of the electric motor according to the present embodiment is the following. As illustrated in FIG. 1 and FIGS. 3 to 7, groove portions 28 are formed at a center portion in the radial direction of an end surface 21a of the outer peripheral wall portion 21 of the insulator 20 that contacts the stator core 30 and an end surface 22a of the winding body portions 22 of the insulator 20 that contacts the stator core 30. The groove portions 28 are cut out at least from the outer peripheral wall portion 21 toward the inner side in the radial direction.

As illustrated in FIG. 3, the outer peripheral wall portion 21 of the insulator 20 contacts the stator core 30 at the end surface 21a. The winding body portions 22 of the insulator 20 contact the stator core 30 at the end surface 22a. The groove portions 28 are formed by cutting out the central portion in the radial direction of the winding body portions 22 from the protrusions 21-1, which are protruding parts of the outer peripheral wall portion 21, toward the inner side in the radial direction of the winding body portions 22, thus extending from the end surface 21a to the end surface 22a.

The size and shape of the groove portions 28 need to be varied depending on the resin material used, the size of the insulator, the operating environment temperature, and the like. For example, in the insulator 20 of the present embodiment, PBT (polybutylene terephthalate) is used as the resin material. Further, in the insulator 20 of the present embodiment, when the radius from the center of the insulator 20 to the inner peripheral surface of the outer peripheral wall portion 21 is approximately 45 mm, the width of the groove portions 28 in the circumferential direction is approximately 5 mm, and the depth from the end surface of the insulator 20 to the bottom surface of the groove portions 28 is 1.5 mm. However, these are examples and do not limit the size or shape. The resin material used for the insulators is also not limited to the above example, and may include PPS (polyphenylene sulfide), liquid crystal polymer, or the like.

The groove portions 28 make it difficult for the inward falling of the outer peripheral wall portion 21 to occur by relieving the internal residual stress of the outer peripheral wall portion 21 of the insulator 20 positioned on the radially outer side of the winding body portions 22. In other words, by forming the groove portions 28 at least on the end surface 21a side of the outer peripheral wall portion 21 of the insulator 20 that contacts the stator core 30, and by making the length of the groove portions 28 in the radial direction greater than the radial thickness of the outer peripheral wall portion 21, the inward falling of the outer peripheral wall portion 21 is made difficult to occur.

As will be seen from FIG. 6, which is the cross sectional view taken along line A-A' of FIG. 4, and FIG. 7, which is the cross sectional view taken along line A-O-B of FIG. 4, the groove portions 28 formed in the winding body portions 22 of the insulator 20 as described above are formed on the end surface 21a side of the outer peripheral wall portion 21 and the winding body portions 22 that contacts the stator core 30.

The insulator 20 of the present embodiment configured as described above and conventional insulator of comparative examples 1 to 3 were constructed of the same resin material. With the insulator having the windings wound thereon and thus forming the stator, a constant stress was continuously applied to the insulator at a constant temperature. FIG. 8 is a diagram illustrating the ratio of change in internal diameter of the wall top portion of the outer peripheral wall portion 21 of the insulator 20 over time. The vertical axis of FIG. 8 represents the ratio of change in internal diameter D of the wall top portion of the outer peripheral wall portion 21 of the insulator 20 in falling rate [%] at the elapsed time 0 H, the change being caused by inward falling due to variation with time. The horizontal axis represents the elapsed time [H]. The falling rate [%] is calculated by the following expression (1):

$$\text{Falling rate } [\%] = [(D-Df)/D] \times 100 \qquad (1)$$

wherein D is the internal diameter of the insulator at elapsed time 0 H and when Df is the internal diameter of the insulator at each elapsed time.

The experiment results show that the amount of displacement of the outer peripheral wall portion 21 of the insulator 20 as it falls inward over time is changed not just by the creep characteristics of the insulator, but also by changing the shape of the insulator.

The experiment data illustrated in FIG. 8 is based on the assumption of a standard operating time of an electric motor used in a compressor or the like for an air conditioner or refrigerator. The data was also acquired by performing an accelerated life test in an atmosphere at a high temperature of 150° C. For example, in the case of resin material, and for those with lower heat resistance class, the accelerated life test was performed using a "8° C. half-life rule" according to Arrhenius' law that says the life time is reduced in half for every 8° C. increase in temperature of use, thus completing the material evaluation test in a shorter time.

The experiment results in FIG. 8 show that the falling rate increased to around 0.2% up to about 5000 hours since the start of use for both the insulator according to the present embodiment and the insulators according to comparative examples 1 to 3. However, the insulator according to the present embodiment stopped exhibiting an increase in the falling rate [%] past around 5000 hours of elapsed time, after which the falling rate of not more than 0.2% was maintained up to around 40000 hours.

On the other hand, in the case of comparative examples 1 to 3, while the ratio of change in the falling rate [%] was decreased past 5000 hours, the falling rate [%] continuously increased until 40000 hours at the end of data acquisition. Thus, in the insulators according to comparative examples 1 to 3, the falling rate [%] eventually exceeded 0.25% and was increased to around 0.30%. Thus, it can be said that the insulator according to the present embodiment is less likely to experience the inward falling of the outer peripheral wall portion 21 due to variation with time than the insulators according to comparative examples 1 to 3.

As described above, in the electric motor according to the present embodiment, a groove portion is formed in the end surface of the winding body portions of the insulator on the stator core side. Thus, when an operation is performed assuming a temperature condition and operation time approximating the actual electric motor operation status, the stress that would cause the outer peripheral wall portion to fall inward with respect to the winding body portions of the insulator can be reduced. As a result, the development of the inward falling event due to variation with time can be reduced.

Further, in the electric motor according to the present embodiment, the radial thickness of the outer peripheral wall portion on the winding body portion side is increased over the radial thickness of the outer peripheral wall portion at the position intermediate between the adjacent winding body portions. Thus, the inward falling of the outer peripheral wall portion can be supported by each of the winding body portions.

Further, in the electric motor according to the present embodiment, the radial thickness of the outer peripheral wall portion on the winding body portion side is increased such that, of the inner peripheral surface of the outer peripheral wall portion where the winding body portions and the outer peripheral wall portion contact each other, a part corresponding to the radially outer side of the winding body portions is formed parallel with the windings wound on the winding body portions. Thus, the aligned winding can be implemented from the end of the winding body portions without gaps. The radially outer side of the winding body portions of the insulator is supported by the aligned wound windings. Thus, the inward falling of the outer peripheral wall portion of the insulator due to variation with time can be prevented. In this way, in the insulator according to the present embodiment, displacement due to variation with time is decreased, whereby the development of a gap between the outer peripheral wall portion of the insulator and the crossover wire is made difficult to occur. As a result, in the insulator according to the present embodiment, deterioration in the insulating performance of the conductive wire due to frictional rubbing caused by, for example, vibrations during rotation of the electric motor, or vibrations due to the flow velocity of refrigerant can be prevented.

Further, the electric motor according to the present embodiment enables the aligned winding, so that the windings of the electric motor stator can be wound at high space factor. As a result, the copper loss of the electric motor is reduced, improving the efficiency of the electric motor.

INDUSTRIAL APPLICABILITY

As described above, the electric motor according to the present invention can be usefully assembled in a rotary compressor or the like of an air conditioner or a refrigerator, for example, as an electric motor that produces little displacement caused by variation with time, such as the inward falling of the outer peripheral wall portion of the insulator, and that does not adversely affect the insulating performance of the conductive wire.

DESCRIPTION OF REFERENCE SIGNS

10 Stator
20 Insulator
21 Outer peripheral wall portion
22 Winding copper portion
23 Insulator edge
24 Insulator opening
25 Insulator slot
26 Outer nail
27 Projection
28 Groove portion
30 Stator core
31 Yoke
32 Teeth
33 Tip edge
34 Slot
35 Slot opening
36 Axial end portion
40 Insulation film
41 Film opening
42 Gate portion
43 Film axial end portion
50 Winding
51 Crossover wire
52 Conductive wire

The invention claimed is:

1. An electric motor comprising a rotor and a stator radially disposed outside the rotor, wherein
the stator includes a stator core and insulators, both formed in an approximately tubular shape, and a conductive wire wound on the stator core via the insulators;
the insulators are oppositely disposed facing the opposite axial both end surfaces of the stator core and each includes an annular outer peripheral wall portion contacting an end surface of an annular yoke of the stator core, with a conductive wire serving as a crossover wire run on an outer periphery side of the annular outer peripheral wall portion, a plurality of winding body portions protruding radially from the annular outer peripheral wall portion toward an inner side in a radial direction and having the conductive wire wound thereon, and an inner flange portion rising from an inner end of each of the winding body portions in an axial direction;
the annular outer peripheral wall portion includes an inner peripheral surface on a winding body portion side, the inner peripheral surface having a planar portion perpendicular to the direction in which the winding body portions protrude, the annular outer peripheral wall portion on the winding body portion side having an outer peripheral surface formed in an arc shape, the annular outer peripheral wall portion having a radial thickness which is increasingly greater toward a circumferential center of the winding body portions; and
a groove portion is formed by cutting out from the annular outer peripheral wall portion to a radially inner side of the annular outer peripheral wall portion, the groove portion locating at an end surface of the annular outer peripheral wall portion directly contacting the stator core and at an end surface of the winding body portion directly contacting the stator core radially inside of the annular outer peripheral wall portion.

2. The electric motor according to claim 1, wherein
the groove portion has a radial length greater than a radial thickness of the annular outer peripheral wall portion at the circumferential center of the winding body portion.

3. The electric motor according to claim 2, further comprising:

a protrusion formed by protruding a part of the annular outer peripheral wall portion on which the winding body portion is disposed, the protrusion protruding toward an outer side in the radial direction, wherein
the groove portion extends to the protrusion.

4. The electric motor according to claim 1, further comprising:
a protrusion formed by protruding a part of the annular outer peripheral wall portion on which the winding body portion is disposed, the protrusion protruding toward an outer side in the radial direction, wherein
the groove portion extends to the protrusion.

* * * * *